Sept. 3, 1929.   J. G. VINCENT   1,727,142
CRANKSHAFT, FLYWHEEL, AND CLUTCH MECHANISM
Filed Feb. 9, 1923   2 Sheets-Sheet 2

Inventor
Jesse G. Vincent
By
Attorney

Patented Sept. 3, 1929.

1,727,142

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

CRANK SHAFT, FLYWHEEL, AND CLUTCH MECHANISM.

Application filed February 9, 1923. Serial No. 617,910.

This invention relates to crankshaft, flywheel and clutch mechanism and is particularly adapted for use in connection with internal combustion engines as employed on motor vehicles.

One of the objects of the invention is to provide a crankshaft, flywheel and clutch mechanism which shall be simple, compact and accessible and which shall occupy a minimum of space axially of the parts.

Another object of the invention is to provide a crankshaft, flywheel and clutch construction which is less expensive to manufacture and assemble than those of the prior art.

Figure 1:
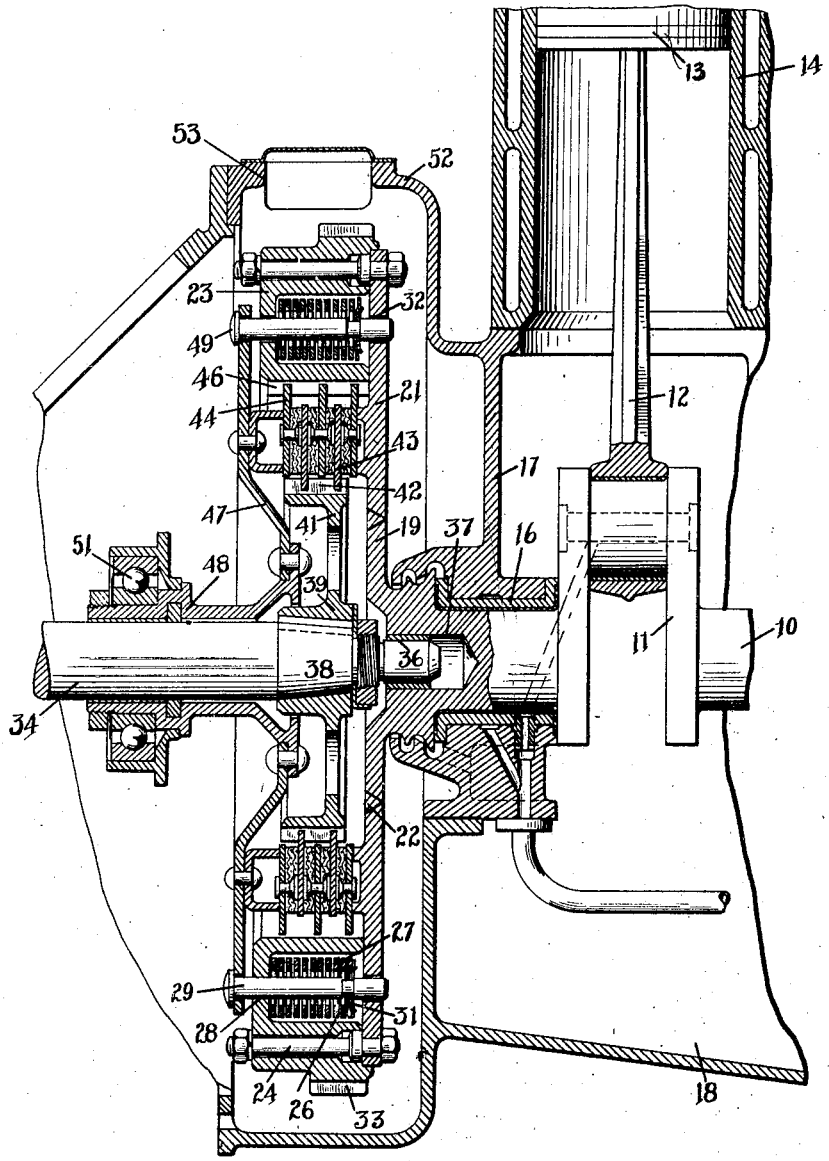
Figure 2:
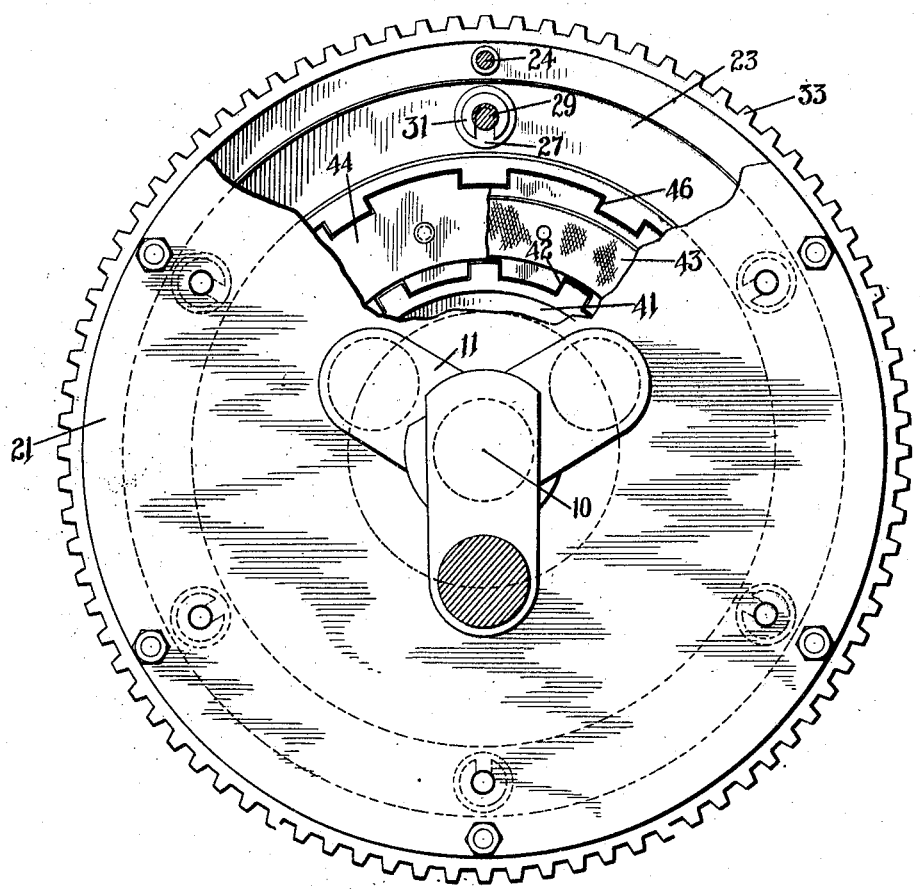

Other objects and structural details will be apparent from the subjoined description, in connection with the accompanying drawing, in which:

Fig. 1 is a vertical longitudinal section through a combined engine flywheel and clutch embodying the invention, and Fig. 2 is a front elevation, partially broken away, of the combined flywheel and clutch shown in Fig. 1, the casing being removed.

It is usual to provide engines, in the art to which this invention relates, with flywheels having an integral rim and web, such web being bolted to a flange formed on the rear end of the engine crankshaft. The clutch is usually arranged adjacent to the flywheel and must be set back a sufficient distance to clear the bolts by which the flywheel is attached to the crank shaft flange, so that the assembly occupies an unnecessarily large amount of space longitudinally of the vehicle. The flywheel rim is usually provided with gear teeth suitable for coaction with a pinion on an electric starter motor. Access to the flywheel for repair of these teeth, and for other purposes, is difficult, because of the size and weight of the flywheel, and damage to the teeth or to the flywheel rim frequently necessitates replacement of the whole flywheel.

To obviate these and other objections to the conventional structure, this invention provides an organization such as is illustrated in the accompanying drawing. At 10 is shown the crankshaft of an internal combustion engine, provided with cranks 11 actuated through connecting rods 12 from pistons 13, which operate in cylinders 14 in the usual manner. The rear end of the crankshaft 10 is journaled in a bearing 16, supported in the end wall 17 of a crank case 18, through which the crankshaft 10 projects. Overhanging the bearing 16 is a flange 19, formed integrally on the projecting end of the crankshaft 10.

The web portion of the flywheel consists of an annular disk 21 which is disposed substantially in the plane of the flange 19, the inner edge being secured to the circumference of the flange 19 by welding, as indicated at 22. In this manner the web portion of the flywheel is permanently secured to the crankshaft in axial alignment therewith. The rim of the flywheel is formed of a ring member 23 secured to the disk 21 near the periphery thereof by suitable bolts 24. The rim 23 is provided, at spaced intervals, with recesses 26 adapted to contain clutch engaging springs 27, the recesses 26 being drilled as at 28 for the passage of pins 29. The pins 29 are provided with washers 31 by which the springs 27 are engaged and compressed as is well understood. The forward ends of the pins 29 play in holes 32, formed in the disk 21. The outer surface of the rim 23 is provided with gear teeth 33, adapted to coact with the pinion of suitable starting apparatus (not shown) to rotate the flywheel in starting the engine.

Axially aligned with the crankshaft 10 is a driven shaft 34, the forward end of which is journaled in a spigot bearing 36, located in a recess 37 in the end of the crankshaft. The driven shaft 34 is provided with a tapered portion 38, to which is keyed, or otherwise secured, the hub 39 of a driven member 41. The periphery of the driven member 41 is splined, as at 42, to a plurality of driven disks 43, which interleave with driving disks 44, splined, as at 46, to the inner surface of the rim 23. The driving disks 44 are urged in an axial direction to engage the driven disks 43 by a pressure plate 47, carried on a sleeve 48 which is slidably mounted relative to the shaft 34. The pressure plate 47 is engaged by heads 49 on the pins 29, so that it is urged into clutch engaging position by the expansion of the springs 27. The sleeve 48 is provided with a thrust bearing 51 through which it can be shifted axially, against the tension of the springs 27, by any suitable clutch actuating mechanism (not shown). The whole clutch and flywheel assembly is enclosed in a suitable bell housing 52 preferably integral with the crank case 18, and provided with the usual opening 53 for adjustments.

The operation of this device will be readily understood from the preceding description. Rearward movement of the thrust bearing 51 retracts the sleeve 48 of the pressure plate 47, carrying with it the pins 29, thus removing spring tension from the clutch disks and allowing the driving and driven disks to separate. The clutch members are engaged by allowing the springs 27 to force the pressure plate 47 into engagement with the driving disks, in the usual well known manner.

It is apparent that this invention provides a compact and easily assembled arrangement of a clutch and flywheel, wherein the rim is readily removed from the web portion for repairs, and which occupies a minimum of room longitudinally. It will also be observed that this structure provides an organization of these elements which is much cheaper to manufacture because of the facility with which the various parts can be separately built and assembled into a unit.

It will be understood that various forms of the invention other than those described above may be used without departing from the spirit or scope of the invention.

What is claimed is:

In combination with an internal combustion engine, a crank shaft, a driven shaft aligned therewith, a clutch element on the driven shaft, a disk welded to the crank shaft, a ring member secured to the disk to overhang the driven shaft, a clutch element driven from the ring member and adapted to cooperate with the first mentioned clutch element, and means carried by the ring member urging said clutch elements into engagement.

In testimony whereof I affix my signature.

JESSE G. VINCENT.